(12) United States Patent
Brand et al.

(10) Patent No.: US 6,884,760 B1
(45) Date of Patent: Apr. 26, 2005

(54) WATER BASED WELLBORE FLUIDS

(75) Inventors: Fabien J. Brand, Paris (FR); Andrew Bradbury, Banchory (GB)

(73) Assignee: M-I, L.L.C., Houston, TX (US)

( * ) Notice: Subject to any disclaimer, the term of this patent is extended or adjusted under 35 U.S.C. 154(b) by 278 days.

(21) Appl. No.: 10/019,122

(22) PCT Filed: Jun. 13, 2000

(86) PCT No.: PCT/EP00/05513

§ 371 (c)(1),
(2), (4) Date: May 20, 2002

(87) PCT Pub. No.: WO00/78890

PCT Pub. Date: Dec. 28, 2000

(30) Foreign Application Priority Data

Jun. 18, 1999 (GB) .............................................. 9914351

(51) Int. Cl.$^7$ ................................................. C09K 7/02
(52) U.S. Cl. ..................... 507/140; 507/111; 507/112; 507/114; 507/115; 507/137; 507/212; 507/214; 507/216; 507/263; 507/269; 507/901
(58) Field of Search ................................. 507/111, 112, 507/114, 115, 137, 140, 212, 214, 216, 263, 269, 901

(56) References Cited

U.S. PATENT DOCUMENTS

| | | | |
|---|---|---|---|
| 3,302,719 A | 2/1967 | Fischer ......................... | 166/42 |
| 3,785,438 A | 1/1974 | Jackson et al. ............. | 166/295 |
| 3,788,406 A | 1/1974 | Messenger .................... | 175/72 |
| 3,878,141 A | 4/1975 | Jackson et al. ........... | 260/17 R |
| 3,979,304 A | 9/1976 | Fischer et al. ........... | 252/8.5 C |
| 4,356,096 A | 10/1982 | Cowan et al. ............ | 252/8.5 C |
| 4,428,843 A | 1/1984 | Cowan et al. ............ | 252/8.5 C |
| 4,526,240 A | 7/1985 | McKinley et al. ............. | 175/72 |
| 4,652,384 A | 3/1987 | Francis et al. ............. | 252/8.51 |
| 5,183,710 A | 2/1993 | Gerbino ...................... | 428/405 |
| 5,228,524 A | 7/1993 | Johnson et al. ................ | 175/72 |
| 5,504,062 A | 4/1996 | Johnson ...................... | 507/212 |
| 5,529,123 A | 6/1996 | Carpenter et al. .......... | 166/293 |
| 5,646,093 A | 7/1997 | Dino .......................... | 507/209 |
| 5,669,456 A | 9/1997 | Audibert et al. .............. | 175/72 |
| 5,720,347 A | 2/1998 | Audibert et al. ............. | 166/294 |
| 5,783,527 A | 7/1998 | Dobson, Jr. et al. ........ | 507/269 |
| 5,851,959 A | 12/1998 | Bernu ........................ | 507/111 |

FOREIGN PATENT DOCUMENTS

| | | | | |
|---|---|---|---|---|
| EP | 0606174 A1 | 7/1994 | ............ | B05D/1/18 |
| EP | 0672740 A1 | 9/1995 | ............ | C09K/7/02 |
| EP | 0691454 A1 | 1/1996 | ............ | E21B/21/00 |
| EP | 0826414 A2 | 3/1998 | ............ | B01J/2/30 |
| EP | 0826414 A3 | 12/1998 | ............ | B01J/2/30 |
| EP | 0899317 A1 | 3/1999 | ............ | C09K/7/00 |
| EP | 1041242 A1 | 10/2000 | ............ | E21B/43/25 |
| GB | 570329 | 7/1945 | ................ | 620/43 |
| GB | 2 120 302 | 11/1983 | | |
| GB | 2120302 A | 11/1983 | ............ | C09K/7/00 |
| GB | 2348447 | 4/2000 | | |
| GB | 2348447 A | 4/2000 | ............ | C09K/7/02 |
| WO | 97/02330 | 1/1997 | ............ | C09K/7/02 |
| WO | 98/05734 | 2/1998 | ............ | C09K/7/06 |
| WO | 99/16834 | 4/1999 | ............ | C09C/1/30 |

OTHER PUBLICATIONS

SU 80–885626 (Dzhienbaev) see WPI Abstract (1980).

Primary Examiner—Philip C. Tucker
(74) Attorney, Agent, or Firm—Osha & May L.L.P.

(57) ABSTRACT

The invention relates to water based wellbore fluids used during a hydrocarbon recovery process, such as drilling, fracturing, gravel packing and wellbore workover. According to the present invention, said wellbore fluid comprises a fluid loss additive and a bridging material that are hydrophobic in nature, hydrophobically modified or oil wettable. The wellbore fluid generates an active filter cake that once formed, is impermeable to an aqueous phase, thus reducing fluid loss and ensuring reduced damage to the formation, yet simultaneously is permeable to the back flow of hydrocarbons during a hydrocarbon recovery process.

7 Claims, No Drawings

WATER BASED WELLBORE FLUIDS

This is the U.S. National Phase (35 U.S.C. § 371) of International Patent Application No. PCT/EP00/05513, filed Jun. 13, 2000, which claims priority under Paris Convention Article 4 to GB 9914351.3, filed Jun. 18, 1999.

The invention relates to wellbore fluids used during a hydrocarbon recovery process, such as drilling, fracturing, gravel packing and wellbore workover. More precisely, the present invention relates to water based fluids.

Wellbore fluids used in the hydrocarbon containing subterranean zones must fulfil besides the usual functions of a drilling fluid also more specific requirements to ensure minimum damage to the formation. The currently available water based drilling fluids are able to ensure minimum damage to the formation and completion due to the selection of the right particle size distribution of the bridging solids, the choice of the fluid loss additive and other components of the fluid.

With standard graded calcium carbonate based drilling fluids and the subsequent filter cake it produces, the initial return permeability may be high. However, the presence of drill-solids can be enough to significantly affect the filter cake behaviour, so reduce the effective permeability of the reservoir and as such a stimulation treatment would be recommended to substantially remove the filter cake.

Furthermore an increasing practice is the drilling of unconsolidated sand reservoirs, where there is a requirement for sand control techniques. One common practice is to use gravel packs. Unfortunately the gravel pack tends to exacerbate the changes in filter cake behaviour, the formation damage level and so the effective permeability, even with clay-free wellbore fluid. This is further exacerbated with the drill-solid contaminated well-bore fluid where the return permeability can be zero up to differential pressures of 400 kPa.

Any attempt to remove the drill-solid from the mud with the technique commonly used on the surface (e.g. sieves, hydrocyclones, centrifuges) would inevitably remove as well at least partially the bridging solids and so affect not only their concentration but also their particle size distribution in the mud. The fluid potential for minimal formation damage achieved by the right bridging solid concentration and especially particle size distribution would therefore be detrimentally affected.

In summary the ultimate productivity of a well can be strongly impacted by the damaging potential of the wellbore fluid, the detrimental effect of drill-solids to filter cake performance and the complication of the compatibility of well bore fluid components with the sand control techniques. This means that there will be in many instances a requirement for stimulation of the filter cake, where the stimulation process in itself can be ultimately damaging to the completion or reservoir. Accordingly there is a need for a well-bore fluid that will be non-damaging to the hydrocarbon formation and the sand control techniques and also not require any external stimulation process to allow hydrocarbons to flow.

The use of wellbore fluids for conducting various operations in oil and gas wells which contact a producing formation are well known. Drill-in fluids are used when initially drilling into producing formations. Completion fluids can be used when conducting various completion operations in the producing formations. Workover fluids are utilized when conducting remedial operations to the wellbore and hardware.

One of the most important function of these fluids is to seal off the face of the wellbore so that excessive fluid is not lost to the formation, so reducing the potential for formation damage and hence ensuring a better reservoir productivity.

Many concepts have been proposed for contacting the producing zone of oil and gas wells.

These fluids generally contain polymeric viscosifiers such as polysaccharides, polymeric fluid loss control additives such as lignosulfonates or polysaccharides and bridging solids.

Some provide better fluid loss reducing properties by providing new modifications to the fluid loss additive (e.g. U.S. Pat. No. 4,652,384, U.S. Pat. No. 5,851,959), by using pore blocking water swellable gel (e.g. WO9702330, U.S. Pat. No. 4,526,240), by replacing the bridging solids (e.g. U.S. Pat. No. 5,228,524, U.S. Pat. No. 5,504,062, EP0691454, U.S. Pat. No. 3,878,141, U.S. Pat. No. 3,785,438, GB2120302, U.S. Pat. No. 3,788,406, GB570329) or by using a sealant composition (e.g. EP0899317, U.S. Pat. No. 5,529,123). GB2120302 includes the use of hydrophobically coated glass particles to improve fluid loss properties. It has also been proposed to use a well drilling system that generate an easily removeable filter cake or a treatment to remove the filter cake (e.g. EP0672740, U.S. Pat. No. 5,783,527, WO9805734).

In most of the above mentioned documents, the hydrocarbon recovery process include a preliminary filter cake treatment or removal to achieve a better productivity. Some invention mentioned include the use of oil wettable, hydrophobic or hydrophobically modified bridging solids or components. However their intention is to improve fluid loss properties or create a new type of gravel pack.

A main object of the present invention is a water based wellbore fluid comprising a fluid loss additive and a bridging material that are hydrophobic in nature, hydrophobically modified or oil wettable. Wellbore fluids are referred to as mud, drill fluid, drill-in fluid, completion fluid, workover fluid or kill fluid.

The concept behind the present invention is to provide a water based drilling fluid system which generates an active filter cake. Whereby the active filter cake once formed is impermeable to an aqueous phase, thus reducing fluid loss and ensuring reduced damage to the formation, yet simultaneously is permeable to the back flow of hydrocarbons during a hydrocarbon recovery process.

The permeability of the filter cake to hydrocarbons does not rely on the presence of oil soluble material as constituent but on the presence of constituents reducing the interfacial tension to hydrocarbons enabling the creation of paths for hydrocarbons to flow through the filter cake. In this manner the filter cake will not break or disperse so eliminating potential damage to the completion from filter cake fragments.

The use of oil soluble material is one way of designing an active filter cake. However in our preferred embodiment we use a different principle in which the properties of the active filter cake are achieved without desegregation of the filter cake during a hydrocarbon recovery process. This presents the advantage of keeping intact both properties of the active filter cake, (permeability to hydrocarbons and impermeability to an aqueous phase).

Nevertheless our preferred embodiment can be combined with the use of oil soluble material. This presents the advantage of creating paths for hydrocarbons through the cake and improving the accessibility of the oil to the oil soluble material inside the filter cake.

The filter cake is preferably compatible with the formation and the completion hardware and techniques i.e. the permeability of the filter cake to hydrocarbons is not significantly affected by varying the type of formation or by using different types of completion.

The drilling fluid system of the present invention generates preferably an active filter cake without the need of a subsequent external stimulation (chemical or mechanical treatment). The cake can be easily removed or stay in the well during a hydrocarbon recovery process. Due to the presence of new hydrophobic components or hydrophobic modifications brought to conventional components of well fluids, those fluids generate filter cakes with the hydrophobic sites organised and structured in such a way that the hydrocarbons can flow easily through the filter cake during a hydrocarbon recovery process.

The fluid loss additive of the present invention is preferably selected from hydrophobically modified starch, polyanionic cellulose, carboxymethylcellulose, hydrophobically modified synthetic polymers e.g. polyhydroxypropylmethacrylate. Most preferred fluid loss additive is a polymerised starch or a starch modified by hydroxymethylation, hydroxypropylation, by other hydroxyalkylations or by crosslinking reactions using agents such as phosphorous oxychloride, epichlohydrin, cyanuric chloride, formaldehyde or others.

Examples of hydrophobic bridging materials are known from the British Application 9907017.9 filed on Mar. 27$^{th}$, 1999 that discloses a wellbore-fluid additive which is a ground crystalline material of melting point over 80° C., preferably over 10° C. which is readily soluble in produced hydrocarbons such as crude oil and lighter condensates and which exhibits a molecular weight of less than 1000, and preferably less than 650. Examples of low molecular weight crystalline additives are 1-S-endo-Borneol, camphor or iodine. Other examples include beta carotene with a melting point of 184 degrees Celsius and a molecular weight of 537, lycophene (175;537); cholesterol (150;387), lanosterol (139; 426) and agnosterol (165; 424).

The bridging solid of the present invention may also be constituted of a hydrophobically coated substrate selected among The substrate for the hydrophobic coating is selected among carbonates such as calcium carbonates, zinc carbonates, barium carbonates, coated metal oxide such as hematite, ilmenite, magnesium oxide or other particles such as barite, silica particles, clay particles, microspheres.

The hydrophobic coating is achieved by adsorption of substances onto the surface of a particle or molecule by physisorption or chemical reactions with reactive groups that are present on the surface of this particle or molecule. Examples for such substances are selected among fatty oils, fatty acids, fatty esters, carboxylated, sulfonated, sulfated, phosphonated hydrophobic material, surfactants that would generate a hydrophobic coating, organosilane grafting agents. Those substances introduce alkylsilyl groups or hydrocarbon groups like alkyl groups, especially of long chain onto the surface of the substrate. Coating processes or examples are described in WO9916834, EP0826414, U.S. Pat. No. 5,183,710, EP0606174.

These and other features of the invention will become appreciated and understood by those skilled in the art from the detailed description of the following examples.

Preparation and Dynamic Ageing (Hot Rolling) of Muds

The well drilling fluids were prepared according to the following procedure.

1. The brine phase including water as base fluid, salts, a biocide and an antifoaming agent was prepared using an Heidolph paddle mixer.
2. A vortex is created with the paddle mixer to add the polymers (viscosifier, fluid loss additive . . . ) slowly into the brine phase, ensuring that all polymer has completely dispersed. Mixing is continued for a further 30 min. The mixer speed is readjusted as necessary.
3. Other powdered additives (carbonates, clays, magnesium oxide for pH adjustment . . . ) are slowly added into the vortex and mixted for a further 15 min.
4. The mixture is transferred to a Silverson LR2 mixer and mixed at 6000 rpm for 5 minutes.
5. The mixture is transferred back to the Heidolph and mixed for a further 10 minutes. The pH and rheological properties are measured.

Dynamic ageing was carried out by hot rolling the fluids in cells pressurised at 250 psi with nitrogen in an oven for 16 hours. After cooling, the muds were homogenised with a Heidolph paddle mixer for 10 min and the pH and rheological properties were measured. For all formulations a pH in the range 9–10 was used.

Rheology Before (BHR) and After Hot Rolling (AHR)

The measurements were performed at 120° F. (49° C.) with a 6 speed Fann rheometer BHR (before hot rolling) and AHR (after hot rolling). The rheological properties of the drilling fluids are described by the plastic viscosity in centipoise PV (based on the reading at 600 rpm and 300 rpm) and the yield point in pounds per 100 square feet YP. The gel strengths are evaluated by the 10 second and 10 minute gel strengths in pounds per 100 square feet.

HPHT Fluid Loss

The HPHT spurt loss after 20 sec. and HPHT Fluid-Loss after 16 hrs were obtained during the formation damage study when forming the filter-cake on a formation core (filtration area 5.06 cm$^2$ and length 3 cm) or aloxite ceramic disc, (filtration area: 23.8 cm$^2$ and length 0.6 cm).

Formation Damage Studies

Formation damage is defined as any process that impairs the permeability of reservoir formations to the extent that hydrocarbon production in wells is reduced. Formation damage can occur at all stages of well construction, completion, workover or during production.

1. Experimental Set-up

The basis of measuring formation damage is the measurement of the permeability of a core of formation (or a synthetic ceramic disc simulating the formation) to the flow of kerosene (simulating the hydrocarbons) before and after a drilling fluid has been filtered through it. The measurement of the flow rate of kerosene is based on the logging of the flow rate of kerosene (in ml/s) at equilibrium through a core (or disc) of known diameter and length. From the Darcy equation below we are able to calculate the permeability of the core (K) in Darcy: $K=(Q \mu L)/(DP.A)$, where Q is the rate of kerosene flow ml/s, $\mu$ is the fluid viscosity of the kerosene in centiPoise, L is the length of the core or disc (cm), DP is the pressure drop across the core or disc (atmosphere), A is the surface area of the core (cm$^2$)

In the described examples, the flow of kerosene was carried out typically at 80° C. The core (or disc) is mounted at one end of a double ended HPHT cell, with the kerosene flowing into the cell filled with kerosene or the packing simulation saturated with brine above the core (or disc). The kerosene displaces rapidly the brine phase and overflows through a top valve into the beaker.

The kerosene is transported under pressure from a cylinder into the reservoir. The kerosene is then passed vertically upwards through a heating jacket to preheat it prior to entering the cell which is also heated. Pressure is regulated for stable kerosene flows through the core (or discs).

2. Initial Permeability

The cores of Clashach sandstone (typical initial permeability 700–1200 mD) were dry cored from a solid sample of material and cut with a diamond saw to a standard length of 3.00 cm and diameter 2.54 cm. The cores were then placed in a vacuum dessicator, kept under vacuum for 2 hours to remove trapped air from the cores before being tipped into a brine solution typically potassium chloride (3%) or sodium chloride/calcium chloride brine (9.5% and 0.5% respectively) to saturate for 24 hours.

Initial permeabilities were measured with odourless kerosene using the apparatus described above with the kerosene pre heater and the HTHP jacket preset to typically 80° C. The cell was allowed to equilibrate prior to runs being made at 10, 6, 4 and 2 psi. Kerosene flow rate was measured by logging the weight of oil deposited into a beaker every 10 seconds. Kerosene flow was continued until either a minimum of kerosene was flowed through the core or a minimum of time had elapsed (whichever was the sooner) to ensure equilibrium was reached. The data file was converted to a spreadsheet and input into the Darcy equation that allowed for the variables of core length, diameter and kerosene viscosity to be altered.

Analysis of the resultant graph shows that a plateau is reached after a period of time. By identifying the point at which this plateau is reached, the average permeability at the equilibrium level can be calculated. In addition the standard deviation of this area can be calculated in order to give a measure of the degree of accuracy of the average.

The aluminium oxide discs with a permeability of 20D to air and porosity of 60 microns (according to the manufacturer HILTON Instruments) were tipped into a brine solution typically potassium chloride (3%) and placed in a vacuum dessicator, kept under vacuum for 2 hours to remove trapped air.

Initial permeabilities with or without a gravel pack were measured. The results being more consistent due to the controlled synthesis of the discs and the well defined gravel packs, the filter cake was formed. The percentage of return permeability taken as reference was calculated using an average initial permeability for runs being made at 4, 3, 2 and 1 psi.

3. Mud-off

The mud off stage of the procedure is carried out statically after dynamic ageing of the muds. If present, the kerosene in the cell was replaced by the mud after rinsing with a 3% potassium chloride brine. The mud was then filtered, through the core (filtration area 5.06 cm², core length 3 cm) or disc (filtration area 23.8 cm², width 0.6 cm) for 16 hours typically at 80° C. and 500 psi.

Following the mud-off the cell was rinsed out three times with fresh brines to remove the excess mud. Care was taken in the cleaning process in order not to disturb the filter cake on top of the core or disc.

4. Return Permeability

To simulate standalone completions in consolidated formations (stable holes), the cell was filled with fresh kerosene and the formation damage cell was reassembled. Return permeabilities were carried out in an identical fashion to those for the initial permeability measurements. The flow back is carried out at constant differential pressure. The differential pressure is increased stepwise until flow is initiated. The differential pressure at which the flow starts is referred in the present invention to the Flow Initiation Pressure (FIP).

To simulate gravel packed wells, a sand pack was used. A sufficient volume of a 3% potassium chloride brine is placed above the filter cake, the cell is filled by pouring and packing the sand to fill the cell (up to the top). If necessary more brine is added to allow saturation and tight packing of the sand. The cell is then reassembled, with the 45-micron mesh size screen between the gravel-pack and the top lid of the cell.

EXAMPLE 1

The following base formulation 1 was mixed according to the general procedure described above and subsequently dynamically heat aged at 80° C. for 16 hours. It represents the case of a standard calcium carbonate reservoir fluid currently available on the market for most reservoir drilling applications.

Formulation 1 has a density of 1.17 g/cm³ (9.8 ppg or pounds per gallon) and comprises Brine NaCl 6.9 wt. %, KCl 4 wt. % in fresh water; Biocide 0.00057 g/cm³ (0.2 ppb (pounds per barrel of 42 gallon); an antifoamer 0.2 ppb; Fluid Loss Additive (starch) 0.0142 g/cm³ (5 ppb); Viscosifier (scleroglucan) 0.0037 g/cm³ (1.3 ppb); Bridging material (standard calcium carbonate) 0.1283 g/cm³ (45 ppb); pH control additive (magnesium oxide) 0.000856 g/cm³ (0.3 ppb).

Formulation 2 is identical to formulation 1 but further contains 0.0472786 g/cm³ (15 ppb) of drill-solids (clay).

Example 1 illustrates the background for this invention. It shows the adverse effect of clay added to the standard calcium carbonate formulation on the return permeability for a standalone simulated well. A sandstone Clashach core of initial permeability 750 mD is used. Filtration is carried out for 16 hours at 80° C. and differential pressure of 3.447 MPa (500 psi, pounds per square inch). The following rheological properties AHR at 48.88° C. (120F) and percentage return permeabilities at 80° C. after filtration were measured.

|  | Standalone simulated well | |
| --- | --- | --- |
|  | Formulation 1 | Formulation 2 |
| Rheology: PV/YP | 10/20 | 20/13 |
| Gels: 10 s./10 min. | 10/12 | 4/8 |
| HTHT @ 80° C.-500 psi | 6 ml (32 ml)* | 7.5 ml (27 ml)* |
| Return Permeability | 96% | 64% |

( )* for a 60 micron aloxite disc

EXAMPLE 2

Example 2 illustrates the background for this invention. It shows the effect of clay added to the standard calcium carbonate formulation on the return permeability for a gravel packed simulated well. The presence of the gravel pack reduces drastically the back flow of hydrocarbons.

A 60 microns aloxite disc, with a 20/40 (0.425 to 0.85 mm sized sand), sand pack of is used. Filtration is carried out for 16 hours at 80° C. and differential pressure of 500 psi.

|  | 20/40 Gravel packed simulated well | |
| --- | --- | --- |
|  | Formulation 1 | Formulation 2 |
| HTHT @ 80° C.-500 psi | 31 ml | 28 ml |
| Return Permeability | 10% | 0% |

EXAMPLE 3

Example 3 illustrates the background for this invention. It shows the effect of temperature on the return permeability for a gravel packed simulated well and formulation 2.

A 60 microns aloxite disc, with a 12/20 sand pack is used. A 12/20 sand is more permeable than a 20/40 sand (0.425 to 0.85 mm sized sand). Filtration is carried out for 16 hours at various temperatures and differential pressure of 500 psi. The following rheological properties AHR at the filtration temperature (when lower then 120F) or at 120F (when higher than 120F) and percentage return permeabilities after filtration at this temperature were measured.

|  | 12/20 gravel pack simulated well/Formulation 2 | | |
| --- | --- | --- | --- |
|  | 80° C. | 40° C. | 21° C. |
| Rheology: PV/YP | 19/16 | 20/19 | 29/28 |
| Gels: 10 s./10 min. | 7/14 | 7/24 | 9/28 |
| HTHT @ 80° C.-500 psi | 27 ml | 24 ml | 19 ml |
| Return Permeability | 5% | 17% | 20% |

EXAMPLE 4

Example 4 shows the effect of a change in the Fluid Loss Additive/Viscosifier ratio in formulation 2 on the return permeability for the gravel packed simulated well. A 60 microns aloxite disc and sand pack 20/40 is used. Filtration is carried out at 80° C. and differential pressure of 500 psi.

|  | Gravel pack 20/40 simulated well | |
| --- | --- | --- |
|  | Formulation 2/<br>FLA/Visc. 8 ppb/1.3 ppb | Formulation 2/<br>FLA/Visc. 7 ppb/2 ppb |
| Rheology: PV/YP | 29/26 | 26/26 |
| Gels: 10 s./10 min. | 6/11 | 12/19 |
| HTHT @ 80° F.-500 psi | 21 ml | 24 ml |
| Return Permeability | 0% | 0% |

EXAMPLE 5

Example 5 shows the effect of a change of the brine phase in formulation 2 on the return permeability for the gravel packed simulated well. A 60 microns aloxite disc and sand pack 20/40 of is used. Filtration is carried out at 80° C. and differential pressure of 500 psi.

|  | Gravel pack 20/40 simulated well<br>Formulation 2/Brine phase: | | | |
| --- | --- | --- | --- | --- |
|  | CaCl$_2$ -<br>10 ppb | CaCl$_2$ -<br>35 ppb | CaCl$_2$/KCl<br>10 ppb/<br>10 ppb | CaCl$_2$/KCl<br>35 ppb/10 ppb |
| Rheology: PV/YP | 8/41 | 8/47 | 15/28 | 22/28 |
| Gels: 10 s./10 min. | 18/21 | 17/20 | 13/20 | 12/19 |
| HTHT @ 80° C.-500 psi | 27 ml | 26 ml | 31 ml | 24 ml |
| Return Permeability | 0% | 0% | 0% | 0% |

EXAMPLE 6

Example 6 shows the effect of a change of type of viscosifier in formulation 1 and 2 on the return permeability for the gravel packed simulated well. A 60 microns aloxite disc and sand pack 20/40 of is used. Filtration is carried out at 80° C. and differential pressure of 500 psi.

|  | Gravel pack 20/40 simulated well | |
| --- | --- | --- |
|  | Formulation 1/<br>Viscosifier:<br>xanthan 1.3 ppb | Formulation 2/<br>Viscosifier:<br>xanthan 1.3 ppb |
| Rheology: PV/YP | 11/21 | 13/21 |
| Gels: 10 s./10 min. | 5/6 | 9/10 |
| HTHT @ 80° C.-500 psi | 34 ml | 27 ml |
| Return Permeability | 7% | 0% |

EXAMPLE 7

The following base formulation 3 was mixed according to the general procedure described above and subsequently dynamically heat aged at 80° C. for 16 hours.

Formulation 3 has a density of 9.8 ppg (pounds per gallon) and comprises: Brine NaCl 6.9 wt. %, KCl 4 wt. % in fresh water; Biocide 0.2 ppb (pounds per barrel); an antifoamer 0.2 ppb; Fluid Loss Additive (starch) 5 ppb; Viscosifier (scleroglucan) 2 ppb; Bridging material (hydrophobically coated calcium carbonate/standard calcium carbonate 18 ppb/27 ppb) 45 ppb; Drilling solids (clay) 15 ppb; pH control additive (magnesium oxide) 0.3 ppb.

Example 7 shows the effect of using as bridging solids a blend of hydrophobically coated and standard non-coated calcium carbonate on the return permeability for the gravel packed simulated well. A 60 microns aloxite disc and sand pack 20/40 is used. Filtration is carried out at 80° C. and differential pressure of 500 psi.

|  | Gravel pack 20/40 simulated well<br>Formulation 3 |
| --- | --- |
| Rheology: PV/YP | 24/25 |
| Gels: 10 s./10 min. | 8/27 |
| HTHT @ 80° C.-500 psi | 26 |
| Return Permeability | 0% |

EXAMPLE 8

The following base formulation 4 was mixed according to the general procedure described above and subsequently dynamically heat aged at 80° C. for 16 hours.

Formulation 4 has a density of 9.8 ppg (pounds per gallon) and comprises: Brine NaCl 6.9 wt. %, KCl 4 wt. % in fresh water; Biocide 0.2 ppb (pounds per barrel); an antifoamer 0.2 ppb; Fluid Loss Additive (hydrophobically modified starch) 8 ppb; Viscosifier (scleroglucan) 2 ppb; Bridging material (standard calcium carbonate) 45 ppb; Drilling solids (clay) 15 ppb; pH control additive (magnesium oxide) 0.3 ppb.

Example 8 shows the effect of using as Fluid Loss Additive a hydrophobically modified starch on the return permeability for the gravel packed simulated well. A 60 microns aloxite disc and sand pack 20/40 of is used. Filtration is carried out at 80° C. and differential pressure of 500 psi.

|  | Gravel pack 20/40 simulated well Formulation 4 |
|---|---|
| Rheology: PV/YP | 19/16 |
| Gels: 10 s./10 min. | 5/9 |
| HTHT @ 80° C.-500 psi | 21 ml |
| Return Permeability | 0% |

EXAMPLE 9

The following base formulation 5 and 6 were mixed according to the general procedure described above and subsequently dynamically heat aged at 80° C. for 16 hours. The formulation includes the combination of a coated calcium carbonate and a hydrophobically modified starch and drilling solids (clay).

Formulation 5 has a density of 9.8 ppg (pounds per gallon) and comprises: Brine NaCl 6.9 wt. %, KCl 4 wt. % in fresh water; Biocide 0.2 ppb (pounds per barrel); an antifoamer 0.2 ppb; Fluid Loss Additive (hydrophobically modified starch) 8 ppb; Viscosifier (scleroglucan) 2 ppb; Bridging material (hydrophobically coated calcium carbonate/standard calcium carbonate) 18 ppb/27 ppb) 45 ppb; Drilling solids (clay) 15 ppb; pH control additive (magnesium oxide) 0.3 ppb.

Formulation 6 is the same as formulation 5 except that the bridging agent comprises 27 ppb of hydrophobically coated calcium carbonate and 18 ppb of standard calcium carbonate.

Example 9 shows the beneficial effect of the coated calcium carbonate and hydrophobically modified starch on the return permeability in formulation 5 for the gravel packed simulated well. A 60 microns aloxite disc and sand pack 20/40 are used. Filtration is carried out at 80° C. and differential pressure of 500 psi.

The following rheological properties AHR at 120F and percentage return permeabilities at 80° C. after filtration were measured.

|  | Gravel pack 20/40 simulated well | |
|---|---|---|
|  | Formulation 5 | Formulation 6 |
| Rheology: PV/YP | 20/20 | 21/22 |
| Gels: 10 s./10 min. | 5/18 | 6/12 |
| HTHT @ 80° C.-500 psi | 20 ml | 24 ml |
| Return Permeability | 33% | 15% |

Formulation 6 shows the effect of a change in ratio for the bridging solids in formulation 3 on the return permeability for the gravel packed simulated well.

EXAMPLE 10

Example 10 exemplifies the present invention. It shows a minimal effect of a change in the brine phase in formulation 5 on the return permeability for the gravel packed simulated well. A 60 microns aloxite disc and sand pack 20/40 are used. Filtration is carried out at 80° C. and differential pressure of 500 psi.

|  | Gravel pack 20/40 simulated well | |
|---|---|---|
|  | Formulation 5/ Brine phase: CaCl2 10 wt. % | Formulation 5/Brine phase: CaCl2 2.9 wt. %. KCl 2.9 wt. % |
| Rheology: PV/YP | 26/36 | 28/28 |
| Gels: 10 s./10 min. | 8/10 | 6/18 |
| HTHT @ 80° C.-500 psi | 19 ml | 22 ml |
| Return Permeability | 22% | 27% |

EXAMPLE 11

Example 11 exemplifies the present invention. It shows the effect of an addition of a lubricant into formulation 5 on the return permeability for the gravel packed simulated well. A 60 microns aloxite disc and sand pack 20/40 are used. Filtration is carried out at 80° C. and differential pressure of 500 psi.

|  | Gravel pack 20/40 simulated well Formulation 5 + 3% v/v lubricant |
|---|---|
| Rheology: PV/YP | 24/22 |
| Gels: 10 s./10 min. | 6/12 |
| HTHT @ 80° C.-500 psi | 14 ml |
| Return Permeability | 37% |

The flow initiation pressures (FIP) measured for the examples of the present invention were below 30 psi and in most cases below 10 psi. The channels of hydrocarbons through the filter cakes were demonstrated by the presence of isolated spots in the middle of the filter cake after flowing back a kerosene dyed with iodine or a commercially available UV-visible dye.

Simultaneously to the increased permeability of the active filter cake to hydrocarbons, it can be seen by comparing examples 1–8 for conventional drilling fluids with examples 9–11 for drilling fluids of the present invention that the generated active filter cake is able to ensure a smaller damage to the formation, by reducing fluid loss and particulate invasion. Indeed the measured fluid losses in examples 9–11 are significantly lower than in examples 1–3. No turbidity indicative for the loss of solid particles is observed in the filtrate.

Example 4 shows that higher Fluid Loss Additive concentrations in a standard calcium carbonate drilling fluid reduces the fluid loss but does not improve the return permeability permeability of a simulated gravel packed well. Example 5 and 6 show that changing the brine phase or the type of viscosifier in a standard calcium carbonate drilling fluid has no effect on the return permeability of a simulated gravel packed well.

The disclosed drilling fluid system fulfils the usual functions of a conventional drilling fluid. The rheological properties of the drilling fluids of the present invention are perfectly acceptable.

Examples 9–11 describe the performance of the present invention in unfavourable scenarios in which the well is gravel packed and the drilling fluid contaminated by a substantial amount of drill-solids (clay). Example 9 illustrates the present invention with the combination of a hydrophobically coated calcium carbonate and a hydrophobically modified starch. The coated calcium carbonate is used in a blend with non coated calcium carbonate. The example shows the effect of a different ratio between coated and non-coated calcium carbonate on the return permeability. The performance of the drilling system in generating an active filter cake is not improved in this example by an increased amount of coated material. When using a blend of calcium carbonates, the success relies also on the choice of the right particle size distributions of both coated and non-coated components. A change of the ratio coated/non-coated calcium carbonate also affects in this example the overall particle size distribution.

Example 7 illustrates that the use of an oil wettable bridging material alone is not enough for getting return permeability. On the other hand example 8 illustrates that the use of a hydrophobically modified starch alone is not enough either for getting return permeability. The combination of both a modified starch and modified calcium carbonate is therefore a requirement to observe return permeability.

Example 10 demonstrates the performance of the present invention in combination with different brine phases.

In example 11, the performance of the active filter cake is enhanced by adding 3% v/v of a lubricant to a formulation of the present invention. The lubricant as a source of hydrophobic sites and because of its emulsifying properties lowering the yield strength of the filter cake contributes to the performance of the active filter cake.

What is claimed is:

1. A water based wellbore fluid comprising a fluid loss additive and a bridging material, wherein the fluid loss additive is hydrophobic in nature, hydrophobically modified or oil wettable; and, wherein the bridging material is hydrophobic in nature, hydrophobically modified or oil wettable, wherein said bridging solid is selected from the group consisting of hydrophobically modified inorganic salts, or hydrophobic or hydrophobically modified inorganic or organic material, wherein said inorganic salts or inorganic material are selected from the group consisting of hydrophobically coated calcium carbonates, zinc carbonates, barium carbonates, hematite, ilmenite, magnesium oxide, barite, silica particles, clay particles, or microspheres.

2. A fluid according to claim 1, wherein the hydrophobic coating is selected from the group consisting of fatty oils, fatty acid, fatty esters, carboxylated hydrophobic material.

3. A water based wellbore fluid comprising a fluid loss additive and a bridging material, wherein the fluid loss additive is hydrophobic in nature, hydrophobically modified or oil wettable; wherein the bridging material is hydrophobic in nature, hydrophobically modified or oil wettable; and, wherein the bridging agent is a ground crystalline material of melting point over 80° C. which is readily soluble in produced hydrocarbons and which exhibits a molecular weight of less than 1000, and preferably less than 650.

4. A fluid according to claim 3, wherein said bridging agent is selected from the group consisting of 1-S-endo-Borneol, camphor, beta carotene, lycophene, cholesterol, lanosterol, or agnosterol.

5. A water based wellbore fluid comprising a fluid loss additive and a bridging material, wherein the fluid loss additive is hydrophobic in nature, hydrophobically modified or oil wettable;

wherein the bridging material is hydrophobic in nature, hydrophobically modified or oil wettable;

and wherein said fluid loss additive is polyhydroxypropylmethacrylate.

6. The fluid according to claim 2, wherein the hydrophobic coating is sulfonated, sulfated, or phosphonated hydrophobic material, surfactants that would generate a hydrophobic coating, or organosilane grafting agents.

7. The fluid according to claim 3, wherein the bridging agent is readily soluble in crude oil or lighter condensates.

* * * * *